Figure 5:
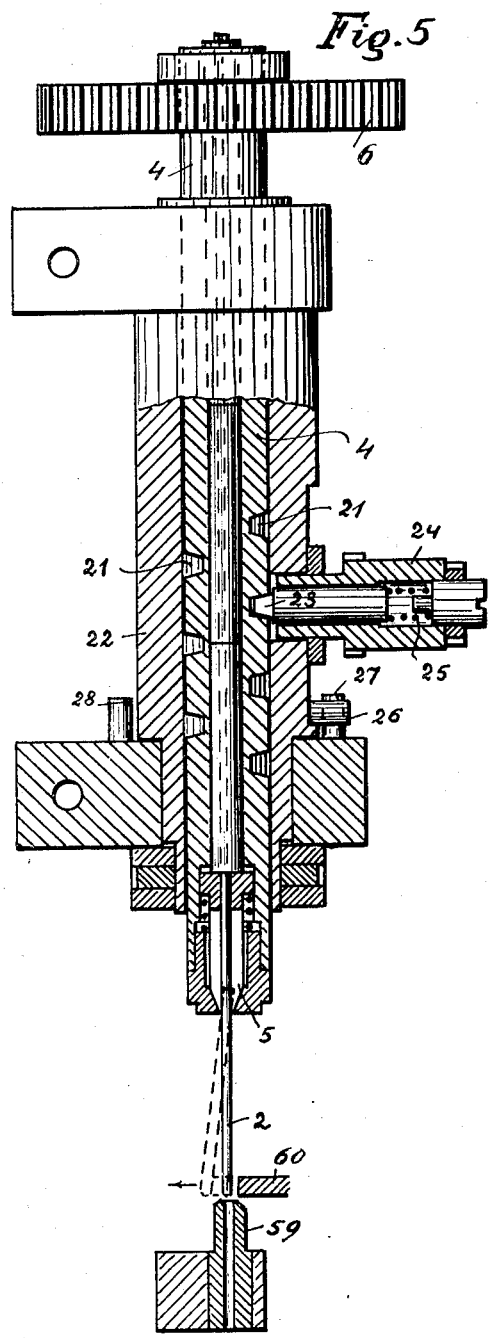

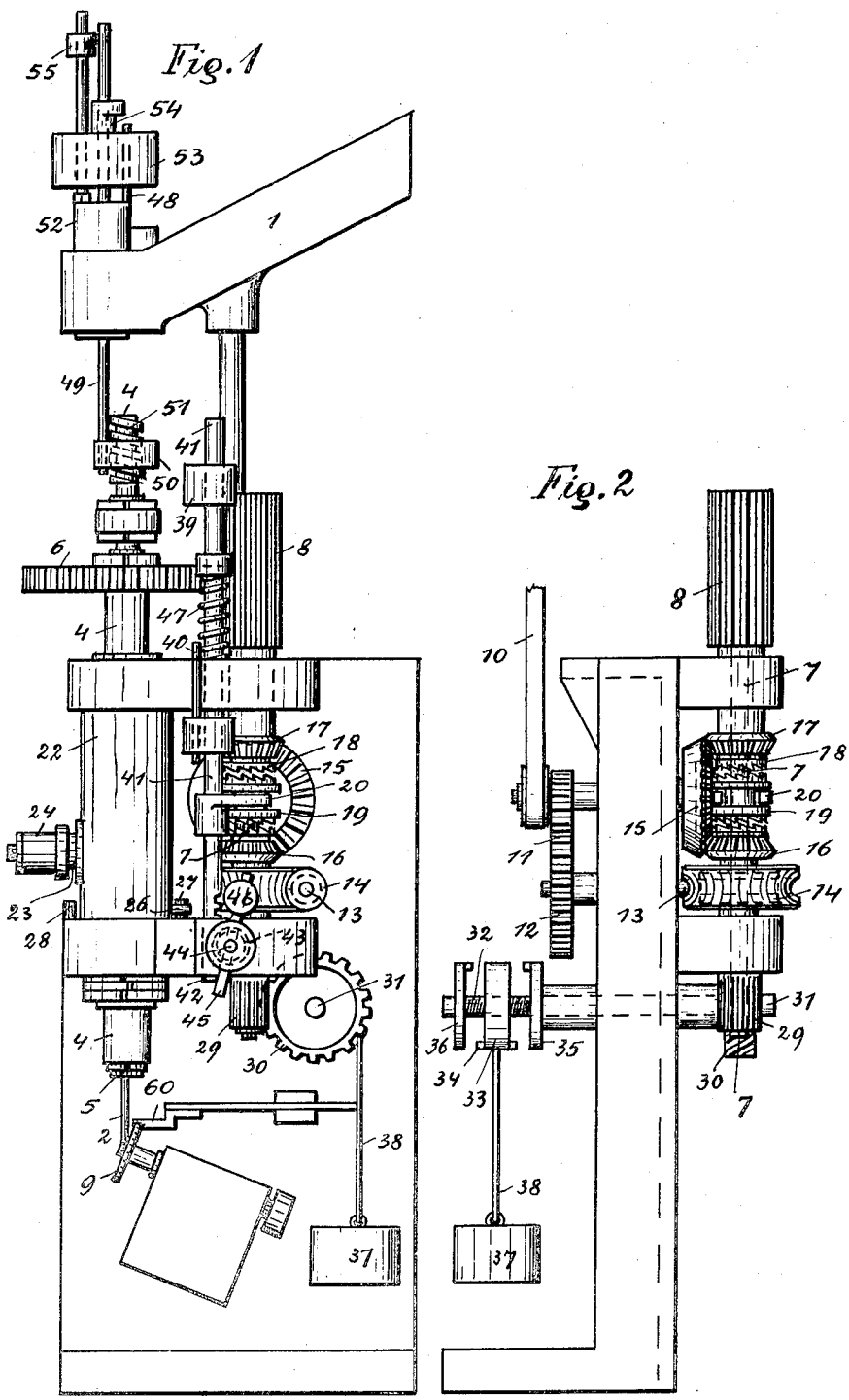

Oct. 31, 1933.  J. BERGSTRÖM  1,933,362
AUTOMATIC TWIST DRILL MILLING MACHINE
Filed Aug. 7, 1930  3 Sheets-Sheet 2
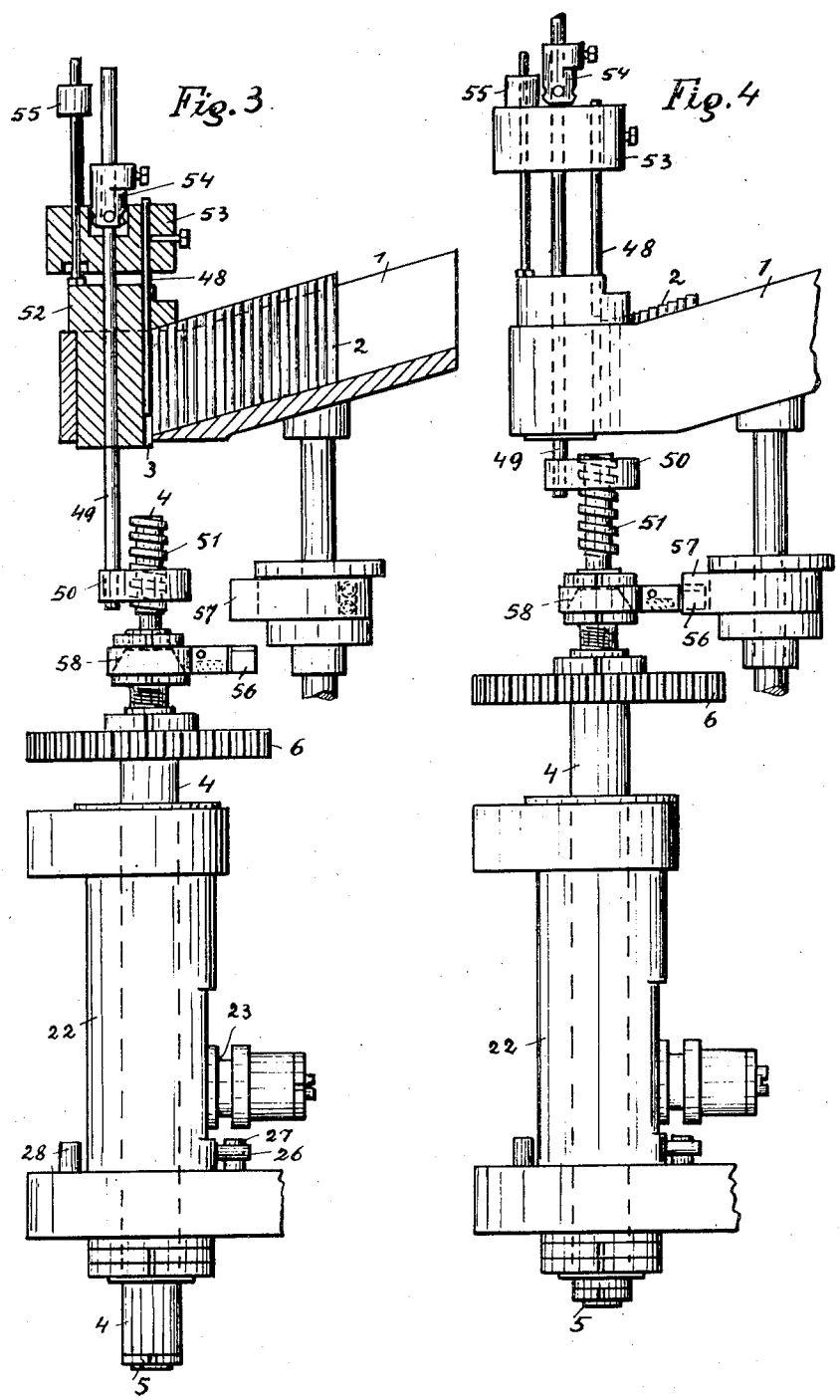
Inventor:
John Bergström Patented Oct. 31, 1933

1,933,362

UNITED STATES PATENT OFFICE 1,933,362

AUTOMATIC TWIST DRILL MILLING MACHINE

John Bergström, Dresden, Germany

Application August 7, 1930, Serial No. 473,658, and in Germany August 8, 1929

4 Claims. (Cl. 90—13.9)

The present invention relates to an automatic twist drill milling machine, in which the blank is fed from the magazine to the working spindle and holding device, slowly moved towards the cutters, rapidly turned after milling and guided back slowly to the cutters for another fluting operation, and after the turning of the working spindle at the end of the last fluting automatically ejected by the blank following it from the holding device at the moment when the latter opens and closes, while, simultaneously, the length for the blank to be worked next is adjusted.

The essential feature of the invention resides in the fact that the working spindle guiding the blank towards the cutters imparts at its return to the ejector knocking the blank from the magazine an additional motion amounting to the length of the drill shank besides the motion equalling the length of the spiral fluting about which the working spindle rotates for the purpose of raising the ejector to the extent of the length of the work, causing it to drop down suddenly by its own weight at the reversal of stroke of the working spindle, and further causing it to guide a piece of work into the spindle the axial motion of which is due to the fact that the working spindle is arranged in a sleeve, provided with a spiral fluting and rotated by means of intermediate wheels and corresponding couplings so that its feed motion corresponds to the spiral fluting to be milled. The rapid radial adjustment of the working spindle takes place by means of a shaft provided with a drum which is wound up by means of coupling discs engaging it according to the right or left hand motion of the shaft and which is unwound suddenly at the release of the clutch coupling to turn the working spindle by means of transmission gears up to a stop, whereupon the removal of the finished work from the holding device is effected by a stop which pushes the work to the side at the moment when at the change of stroke of the feed spindle the chuck for the work is opened and closed automatically so that the finished work is automatically ejected by the blank following it which is disposed on the slide or stop and thus causes the adjustment of the length of the spiral fluting relative to the cutters.

One form of the invention is illustrated in the accompanying drawings, in which Figure 1 is a front view of the machine; Fig. 2, a side view of the gear parts; Fig. 3, a view, partly in section, of the working spindle with feeding device and feed magazine; Fig. 4, a view of the same parts but in different position; and Fig. 5, a vertical section of the working spindle.

Referring to the drawings, 1 is the magazine attached to a column and containing the steel blanks 2 which have the length of the drills to be made and are positioned vertically one after another. Vertically below the opening 3 through which the blanks are ejected the hollow working spindle 4 is disposed into which the blanks are guided and fixed at the lower end in the holding device 5 with chuck. The working spindle 4 is rotated by the driving wheel 6 driven from the shaft 7 by means of the wheel 8, the shaft 7 being driven by a motor, countershaft or belt 10 by means of the gears 11, 12, the worm shaft 13, the worm wheel 14, and the mitre gears 15, 16, 17. The mitre gears 16, 17 are arranged on the driving shaft 7 and carry the rims 18 and 19 so that by bringing the clutch 20 slidingly positioned on the shaft 7 into engagement with one of the rims 18 and 19 the shaft 7 can be coupled with one of the mitre gears 16 and 17 to drive the shaft 7 and the gear 8 to the right or left and thus cause the working spindle 4 to rotate in the same direction.

The working spindle 4 is provided with a recessed spiral fluting or gash 21 and loosely arranged in the sleeve 22 having a tooth 23 which engages the fluting 21 so that at its rotation the spindle 4 is fed according to spiral fluting and the blank held by the device 5 is guided spirally towards the cutters 9. To facilitate the engagement of the tooth 23 and the spiral fluting 21, the tooth is placed in a bushing 24 and cushioned by a spring 25.

As the spindle 4 is arranged loosely in the sleeve 22, the friction developing between these parts causes the latter to cooperate in the rotation of the spindle without participating in the feed motion, the rotation of the sleeve being limited by the stop 26 secured to the sleeve and adapted to strike the stops 27 and 28. In the modification shown the sleeve and therefore the working or feed spindle 4 are turned 180° so that two spiral flutings are milled into the blank, as is usual in twist drills, though other divisions are possible also.

The turning of the spindle 4, which has to take place suddenly and very rapidly at the end of the milling step, is effected in the following manner.

At the lower end of the driving shaft 7 a worm wheel 29 is provided which drives the worm wheel 30 and the shaft 31. The end 32 of the shaft is fitted with a thread on which a drum 33 can be displaced to the right or left which with its teeth 34 engages the discs 35 or 36 fixed on the shaft 31, is turned either to the right or left and winds up a rope 38 carrying a weight 37. When the clutch 20 is in an intermediate position between the rims 18, 19, the weight 37 with the rope 38 is suddenly unwound and, by means of the transmission gears 29, 30, rotates the driving shaft 7 very rapidly in the opposite direction. The gears 8, 6 transmit this motion to the working or feed spindle 4 with the sleeve 22 which is rotated very rapidly also but only 180° owing to the stops 26, 27, 28. Changing over from forward to backward motion, and vice versa, of the spindle 4 is effected by causing the gear 6 on the spindle 4 to strike in its end position upwardly against a stop 39 and below against a stop 40, the two stops being secured to a connecting rod 41 controlling the coupling 20 so that the latter couples the shaft 7 once with the gear 17 and once with the gear 16 and drive takes place either to the left or right. To accelerate the throwing in of the toothed couplings and to insure firm engagement of the latter during operation, the connecting rod 41 is at its lower end formed as a rack 42 and engages a gear 43 on the axis 44 of which a lever 45 rests with the weight 46 which displaces the connecting rod 41 very rapidly and holds it in position. The weight of the rod 41 and of the stops 39, 40 is balanced by the spring 47.

The blanks are fed to and inserted in the hollow working or feed spindle during the reversal of the stroke, at the end of the return motion of the spindle and during the opening and closing of the chuck. For this purpose the hollow spindle is guided on its return directly under the magazine 1 from which a blank is pushed into it by the ejector 48. As the feed spindle moves back only to the extent of the length of the spiral fluting, additional motion covering the length of the drill shank must be imparted to it.

To achieve this, the ejector 48 is raised and lowered by a guide rod 49 arranged with a female thread 50 on the threaded end 51 of the spindle. The guide rod 49 is guided in the block 52 and provided with a weight 53 to which the ejector 48 is adjustably secured. The weight 53 is held by the coupling 54 to the rod 49 until, during its ascent, it strikes the stop 55. However, the guide rod 49 is raised still more until the coupling is disengaged from the weight 53 which then drops down suddenly and, by means of the ejector 48, pushes a blank from the magazine into the spindle 4. At the same moment the stop 56 on the spindle has come within range of the claw or clutch 57, and the cone 58, by turning the spindle at the end of its reversal of stroke, is opened and closed to release and receive a new blank.

The finished work is removed from the chuck 5 during the change of stroke and the opening and closing of the cone 58.

Above the stay 59 guiding the blank towards the cutters a slide or stop 60 is positioned which is moved laterally. When after milling and on the return of the working spindle the work projects from the stay and at the same moment the chuck 5 is opened, the slide or stop 60 presses against the lower end of the finished work and pushes it aside so that it is ejected from the chuck by the blank passing through the hollow spindle 4 and, simultaneously, the blank following the finished work drops on the slide or stop 60 which in the meantime has been moved forward still more. In this way the accurate length is adjusted and the spiral length of all drills becomes identical.

I claim:—

1. An automatic twist drill milling machine, comprising a magazine containing blanks, a hollow feed spindle adapted to move forward and backward and having a threaded upper end, an ejector adapted to push the blanks out of the said magazine and into the said hollow feed spindle, a guide rod secured to the threaded end of the said spindle and adapted to raise and lower the said ejector, a weight, a coupling securing the said weight to the said guide rod, the said ejector being adjustably secured to the said weight, and a stop adapted to be struck by the said weight during the upward stroke of the said spindle to detach the said weight from the said guide rod, the said weight, on dropping down, together with the said ejector pushing the blank out of the opening of the said ejector and into the said hollow feed spindle.

2. In a machine of the type described a spindle, a shaft driving the said spindle, a drum attached to the said spindle, a weight, coupling discs adapted to engage the said drum and to cause the winding up of the said weight by the said drum, a clutch adapted to cause on its release instant unwinding of the said drum and weight, a feed spindle, a transmission gear, and adjustable stops, the said weight being adapted to rapidly displace the said feed spindle by means of the said transmission gear up to the said adjustable stops.

3. In a machine according to claim 1 a driving shaft, a pinion secured to the said shaft and driving the hollow feed spindle, mitre gears arranged on the said shaft, toothed rims forming part of the said gears, a clutch element sliding on the said shaft and adapted to engage one of the said toothed rims, a connecting rod controlling the said clutch element, and stops secured to the said connecting rod for limiting the upward and downward motion of the said pinion and causing the said clutch element to alternately connect the said shaft with one of the said gears to change the direction of motion of the said shaft and pinion.

4. In a machine according to claim 1 a chuck secured to the feed spindle and adapted to hold the blanks and a laterally movable slide arranged below the feed spindle and adapted to act as stop for the work, the said slide pushing the work aside on the return of the spindle and on the opening of the said chuck to cause it to be ejected by the next blank riding on the said slide.

JOHN BERGSTRÖM.